US011953602B2

(12) United States Patent
Bacchus et al.

(10) Patent No.: US 11,953,602 B2
(45) Date of Patent: Apr. 9, 2024

(54) DETECTING THREE-DIMENSIONAL STRUCTURE MODELS AT RUNTIME IN VEHICLES

(71) Applicant: GM GLOBAL TECHNOLOGY OPERATIONS LLC, Detroit, MI (US)

(72) Inventors: Brent N. Bacchus, Sterling Heights, MI (US); Rakesh Kumar, Markham (CA); Keun Jae Kim, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 809 days.

(21) Appl. No.: 16/951,502

(22) Filed: Nov. 18, 2020

(65) Prior Publication Data
US 2022/0155451 A1 May 19, 2022

(51) Int. Cl.
*G01S 17/89* (2020.01)
*G01S 17/86* (2020.01)
*G01S 17/931* (2020.01)
*G06N 3/02* (2006.01)
*G06V 20/56* (2022.01)

(52) U.S. Cl.
CPC .............. *G01S 17/89* (2013.01); *G01S 17/86* (2020.01); *G01S 17/931* (2020.01); *G06N 3/02* (2013.01); *G06V 20/56* (2022.01)

(58) Field of Classification Search
USPC ....................................................... 356/5.01
See application file for complete search history.

(56) References Cited

U.S. PATENT DOCUMENTS

| 10,262,466 | B2 * | 4/2019 | Guo | G06T 3/00 |
| 2016/0036519 | A1 * | 2/2016 | Loomis | G01S 19/41 |
| | | | | 370/316 |
| 2017/0109940 | A1 * | 4/2017 | Guo | G06T 7/30 |
| 2019/0043359 | A1 * | 2/2019 | Rajakondala | G08G 1/0125 |
| 2019/0072984 | A1 * | 3/2019 | Dougherty | B64C 39/024 |
| 2019/0094981 | A1 * | 3/2019 | Bradski | H04N 21/414 |
| 2019/0251743 | A1 * | 8/2019 | Koyama | G08G 1/166 |
| 2020/0226794 | A1 * | 7/2020 | Sugio | G06T 9/00 |
| 2020/0353943 | A1 * | 11/2020 | Siddiqui | G06N 3/045 |

* cited by examiner

Primary Examiner — James R Hulka
(74) Attorney, Agent, or Firm — CANTOR COLBURN LLP

(57) ABSTRACT

A computer-implemented method for detecting one or more three-dimensional structures in a proximity of a vehicle at runtime includes generating, by a processor, a birds-eye-view (BEV) camera image of the proximity of the vehicle, the BEV camera image comprising two-dimensional coordinates of one or more structures in the proximity. The method further includes generating, by the processor, a BEV height image of the proximity of the vehicle, the BEV height image providing height of the one or more structures in the proximity. The method further includes detecting one or more edges of the three-dimensional structures based on the BEV camera image and the BEV height image. The method further includes generating models of the three-dimensional structures by plane-fitting based on the edges of the one or more three-dimensional structures. The method further includes reconfiguring a navigation system receiver based on the models of the three-dimensional structures.

20 Claims, 5 Drawing Sheets

DETECTING THREE-DIMENSIONAL STRUCTURE MODELS AT RUNTIME IN VEHICLES

INTRODUCTION

This disclosure is related to improving performance of a global navigation satellite system (GNSS) that may be equipped on vehicles to provide autonomous geo-spatial positioning, and particularly improving the performance by determining three-dimensional (3D) models of buildings and other structures from a vehicle, using a combination of sensor devices, such as a camera, radio detection and ranging (radar) device, and/or light detection and ranging (lidar) device.

Vehicles, such as cars, trucks, boats, etc., that are equipped with GNSS receivers can provider an operator (human, autonomous, or semi-autonomous) with navigation information. Common GNSS include Global Positioning System (GPS), Global Navigation Satellite System (GLO-NASS), Galileo, Beidou, and other regional systems. GNSS receivers can provide navigation information up to a particular level of accuracy; however, the level of accuracy is typically limited to open-sky environments. For example, in open-sky environments, GNSS receivers can achieve measurements within at least 1.5 meters (m) of accuracy. The GNSS receivers are, generally, less accurate in urban areas, such as cities, particularly in the presence of buildings and other structures. The buildings and other structures block the GNSS receivers' path of receiving signals from the GNSS systems by blocking the receivers' view of the open-sky, and instead creating a high multi-path radio frequency (RF) signal environment.

SUMMARY

A computer-implemented method for detecting one or more three-dimensional structures in a proximity of a vehicle at runtime includes generating, by a processor, a birds-eye-view (BEV) camera image of the proximity of the vehicle, the BEV camera image comprising two-dimensional coordinates of one or more structures in the proximity. The method further includes generating, by the processor, a BEV height image of the proximity of the vehicle, the BEV height image providing height of the one or more structures in the proximity. The method further includes detecting, by the processor, one or more edges of the one or more three-dimensional structures in the proximity based on the BEV camera image and the BEV height image. The method further includes generating, by the processor, models of the one or more three-dimensional structures in the proximity of the vehicle by plane-fitting based on the edges of the one or more three-dimensional structures. The method further includes reconfiguring, by the processor, a navigation system receiver based on the models of the one or more three-dimensional structures in the proximity of the vehicle.

According to one or more embodiments, the BEV height image is generated based on radar data captured from a radar of the vehicle.

According to one or more embodiments, the BEV height image is a BEV radar image that is generated using the radar data.

According to one or more embodiments, detecting the edges of the one or more three-dimensional structures includes generating, by the processor, a merged image by merging the BEV camera image and the BEV radar image to add the height information as a channel for each pixel in the BEV camera image, and detecting, by the processor, the edges by inputting the merged image to an artificial neural network.

According to one or more embodiments, the BEV height image is generated based on lidar data captured from a lidar of the vehicle.

According to one or more embodiments, the camera includes a plurality of cameras equipped on different sides of the vehicle.

According to one or more embodiments, reconfiguring the navigation system receiver includes changing a frequency being used by the navigation system receiver.

According to one or more embodiments, an apparatus equipped in a vehicle, includes a navigation system receiver, a camera, a memory, and a processor coupled with the navigation system receiver, the memory, and with the camera. The processor is configured to perform a method for detecting three-dimensional structures in a proximity of the vehicle at runtime. The method includes generating a birds-eye-view (BEV) camera image of the proximity of the vehicle, the BEV camera image comprising two-dimensional coordinates of one or more structures in the proximity. The method further includes generating a BEV height image of the proximity of the vehicle, the BEV height image providing height of the one or more structures in the proximity. The method further includes detecting one or more edges of the one or more three-dimensional structures in the proximity based on the BEV camera image and the BEV height image. The method further includes generating models of the one or more three-dimensional structures in the proximity of the vehicle by plane-fitting based on the edges of the one or more three-dimensional structures. The method further includes reconfiguring a navigation system receiver based on the models of the one or more three-dimensional structures in the proximity of the vehicle.

According to one or more embodiments, the BEV height image is generated based on radar data captured from a radar of the vehicle.

According to one or more embodiments, the BEV height image is a BEV radar image that is generated using the radar data.

According to one or more embodiments, detecting the edges of the one or more three-dimensional structures includes generating, by the processor, a merged image by merging the BEV camera image and the BEV radar image to add the height information as a channel for each pixel in the BEV camera image, and detecting, by the processor, the edges by inputting the merged image to an artificial neural network.

According to one or more embodiments, the BEV height image is generated based on lidar data captured from a lidar of the vehicle.

According to one or more embodiments, the camera includes a plurality of cameras equipped on different sides of the vehicle.

According to one or more embodiments, reconfiguring the navigation system receiver includes changing a frequency being used by the navigation system receiver.

A computer program product includes a computer storage device that includes computer executable instructions, which when executed by a processing unit cause the processing unit to perform a method for detecting three-dimensional structures in a proximity of the vehicle at runtime. The method includes generating a birds-eye-view (BEV) camera image of the proximity of the vehicle, the BEV camera image comprising two-dimensional coordinates of one or more structures in the proximity. The method further includes generating a BEV height image of the proximity of the vehicle, the BEV height image providing height of the one or more structures in the proximity. The method further includes detecting one or more edges of the one or more three-dimensional structures in the proximity based on the BEV camera image and the BEV height image. The method further includes generating models of the one or more three-dimensional structures in the proximity of the vehicle by plane-fitting based on the edges of the one or more three-dimensional structures. The method further includes reconfiguring a navigation system receiver based on the models of the one or more three-dimensional structures in the proximity of the vehicle.

According to one or more embodiments, the BEV height image is generated based on radar data captured from a radar of the vehicle.

According to one or more embodiments, the BEV height image is a BEV radar image that is generated using the radar data.

According to one or more embodiments, detecting the edges of the one or more three-dimensional structures includes generating, by the processor, a merged image by merging the BEV camera image and the BEV radar image to add the height information as a channel for each pixel in the BEV camera image, and detecting, by the processor, the edges by inputting the merged image to an artificial neural network.

According to one or more embodiments, the BEV height image is generated based on lidar data captured from a lidar of the vehicle.

According to one or more embodiments, the camera includes a plurality of cameras equipped on different sides of the vehicle.

According to one or more embodiments, reconfiguring the navigation system receiver includes changing a frequency being used by the navigation system receiver.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
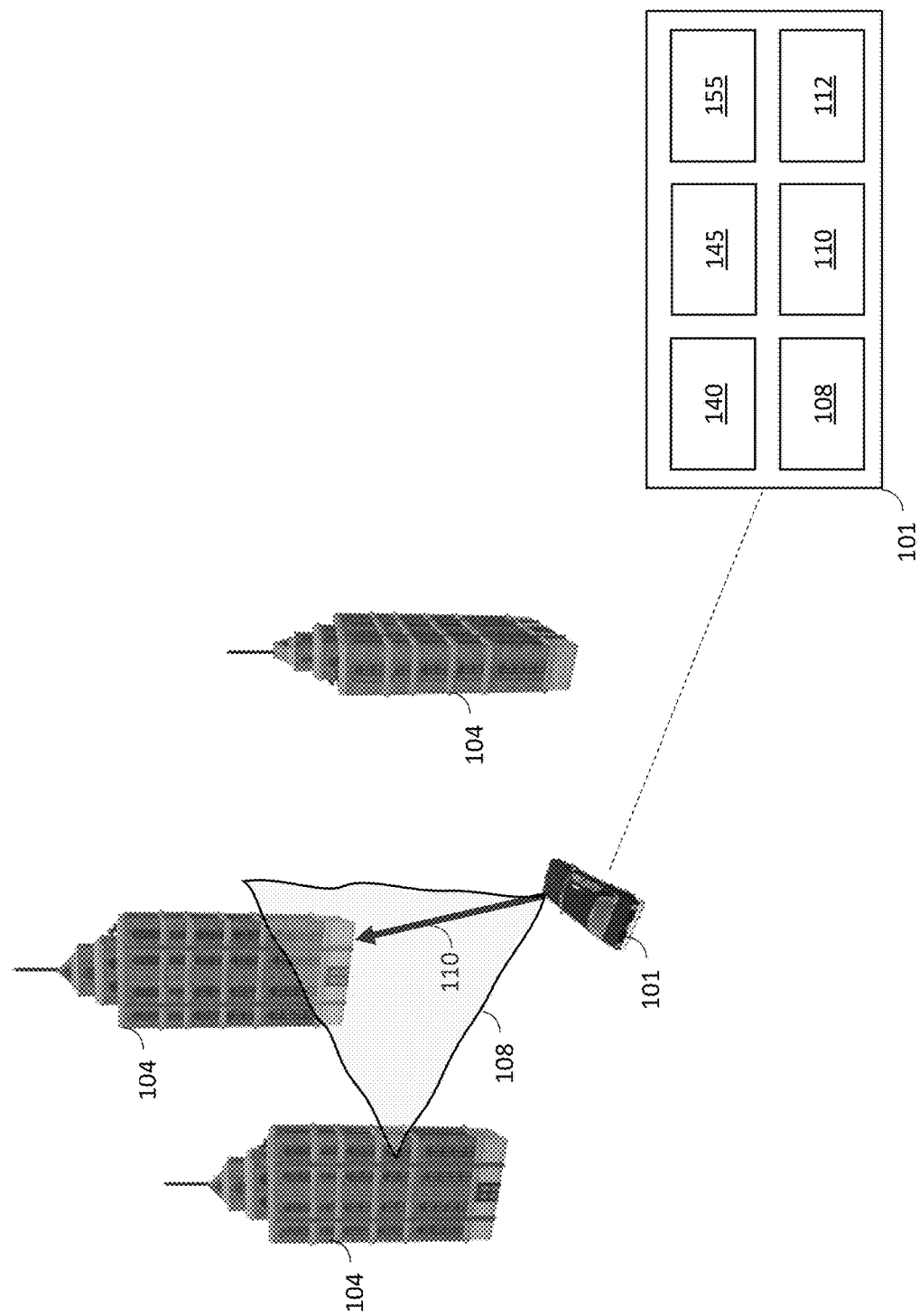
FIG. 1 depicts a block diagram of an exemplary system for sensing the environment in the vicinity of a vehicle and dynamically detecting 3D structures according to one or more embodiments.

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuits (ASIC), electronic circuits, central processing units (preferably microprocessors) and associated memory and storage (read only memory (ROM), random access memory (RAM), electrically programmable read only memory (EPROM), hard drive, etc.), graphic processing units, or microcontrollers executing one or more software or firmware programs or routines, combinational logic circuits, input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Technical solutions described herein address technical challenges with accuracy of global navigation satellite system (GNSS) receivers. As noted earlier, vehicles, such as cars, trucks, boats, etc., that are equipped with GNSS receivers can provide an operator (human, autonomous, or semi-autonomous) with navigation information. However, the level of accuracy is typically limited to open-sky environments, and the GNSS receivers are less accurate in urban areas, such as cities, particularly in the presence of buildings and other structures. The buildings and other structures block the GNSS receivers' path of receiving signals from the GNSS systems by blocking the receivers' view of the open-sky, and instead creating a high multi-path radio frequency (RF) signal environment.

Technical solutions described herein address such technical challenges with the accuracy by dynamically detecting three-dimensional (3D) structures, such as buildings, that can inhibit the GNSS receiver from receiving navigation information. The detection of the 3D structures is performed entirely at runtime, without a-priori information about the models of such structures, such as static maps that include location and other information of the 3D structures. In other words, technical solutions described herein to dynamically detect 3D structures do not require any a-priori information or any continuous update of the map. The technical solutions, accordingly, provide a cost saving over existing solutions that use static maps, or continuously updating maps to detect such 3D structures. In one or more embodiments, structures, such as buildings that are detected with height measurements below (or above) a predetermined threshold are reported, for example, to reduce false alarms caused by structures such as curbs.

Turning now to FIG. 1, a block diagram illustrates an exemplary system 100 for sensing the environment in the vicinity of a vehicle and dynamically detecting 3D structures. System 100 includes a vehicle 101 that is equipped with a processor 140, a memory 145, a GNSS receiver 155, a camera 108, and a radar 110. In one or more embodiments, the vehicle 101 is also equipped with a lidar 112. It is understood that the vehicle 101 can be equipped with additional devices and/or components that are not listed herein.

The processor 140 may be a microprocessor, a graphics processing unit, a digital signal processor, or any other processing unit. The processor 140 can execute one or more computer executable instructions to perform one or more methods described herein. Such computer executable instructions can be stored in the memory 145. The memory 145 can store additional information that is used by the processor 140 during execution of the computer executable instructions. For example, the memory 145 can store temporary values, media (e.g., images, audio, video), and other information to be used during the execution.

Figure 2:
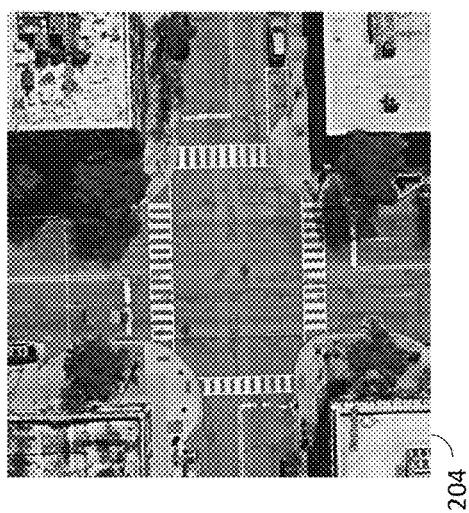
FIG. 2 depicts examples of different types of data captured and obtained by a vehicle according to one or more embodiments.
Figure 2:
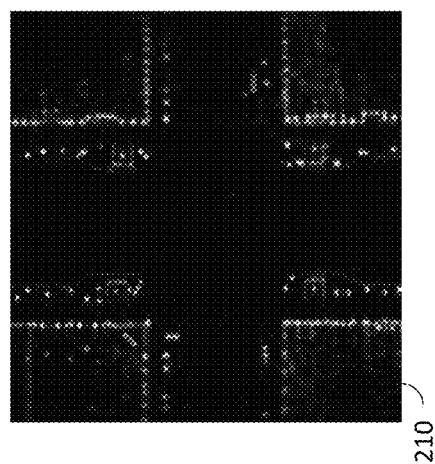
Figure 2:
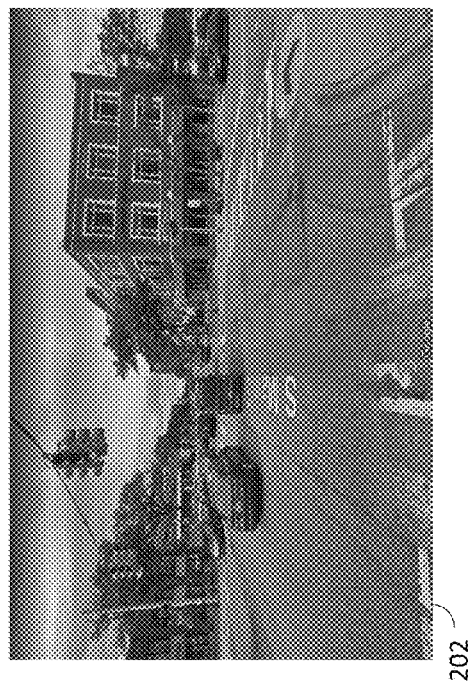
Figure 2:
Figure 2:
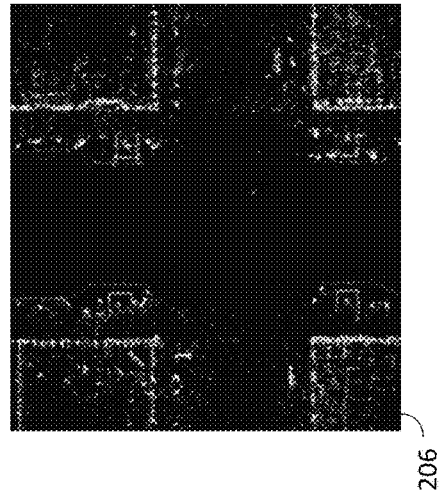

The system 100 may utilize the camera 108, among other sensors, to capture an image 202 (FIG. 2) of the proximity of the vehicle 101. Here, "proximity" of the vehicle 101 can be the surroundings of the vehicle within a predetermined distance (e.g., 50 meters, 100 meters, etc.) from the center (or any other reference point) of the vehicle 101. The camera 108 is operative to capture the image 202 within a field of view (FOV) which may include static and dynamic objects within that FOV. Image processing techniques may be used to locate and classify objects within the FOV. The FOV generally correlates to the driving scene or portion of the driving scene as limited by the FOV.

The camera 108 can include multiple cameras that are placed inside and/or outside the vehicle 101. For example, a subset of the cameras 108 can be placed on the sides, top, front, and/or the back of the vehicle 101 operative to capture the image 202, or a series of images of a field of view proximate to the vehicle 101. In an exemplary embodiment, the camera 108 may include a wide-angle camera. Sensor fusion may be performed to provide accurate detection, classification, tracking, etc. of external objects as well as calculation of appropriate attributes such as relative velocities, accelerations, and the like. The camera 108, in one or more embodiments, facilitates generating a bird's eye view (BEV) image 204 of the vicinity of the vehicle 101.

The BEV camera image 204 is generated using any of the one or more known computer vision techniques. For example, a predetermined number of cameras 108 are mounted around the vehicle 101 so that their views cover the proximity. Parameters of the cameras 108 are calibrated beforehand so that the captured images 202 from the cameras 108 can be de-warped into perspective views for integration. Overlapping regions of adjacent views in the images 202 are stitched together by aligning along a seam with dynamic programming method followed by propagating the deformation field of alignment with Wendland functions. In this way the images 202 can be integrated into a single, panoramic, and seamless BEV camera image 204. It is understood that other techniques can be used for generating the BEV camera image 204, and that aspects of the technical solutions described herein are not limited by which technique is used to generate the BEV camera image 204.

The radar 110 is used to detect objects in the proximity of the vehicle 101. In one or more embodiments, the radar data captured by the radar 110 provides range information of the 3D structures in the proximity of the vehicle 101. In one or more embodiments, the vehicle 101 is equipped with a plurality of radars 110. The radar data captured by the multiple radars 110 is used to generate a BEV radar image 206 (FIG. 2) of the proximity of the vehicle 101. Multiple scans from the radar(s) may be captured and spatially aligned using information from an inertial measurement unit (IMU) to generate the BEV radar image 206. Doppler information from the radar 110 may additionally be used to identify and remove moving objects from the multiple scans prior to generating the BEV radar image 206. The BEV radar image 206 is an image of the proximity of the vehicle 101, where each pixel of the BEV radar image 206 represents a detected object, confidence in a detection, or radar cross-section.

The BEV camera image 204 and the BEV radar image 206 are used together to generate a model that includes the 3D structures in the proximity of the vehicle 101. Generating the model includes calculating height of the structures in the proximity. The height of a target can be calculated using a distance R of the target from the vehicle 101 that is provided by the range information from the radar 110. Further, calculating the height of a target is based on an elevation angle E of the target that can be determined from the image 202. The height for each of the pixel in the camera image(s) 202, representing the structures in the proximity of the vehicle 101 can be determined using the corresponding distance R from the range data and the elevation angle E from the camera image 202.

Based on the model of the proximity, the GNSS receiver 155 can be programmed to improve reception of the navigation signal from the GNSS. For example, the programming can include changing one or more parameters associated with the receiver 155. Alternatively, or in addition, based on the model of the proximity, the navigation information for the vehicle 101 is obtained from a different source, such as a phone (not shown) that may be associated with the vehicle 101, for example, using wired or a wireless connection.

In embodiments where the vehicle 101 includes a lidar 112, a point cloud data 208 of the proximity of the vehicle 101 is captured. The lidar data 208 includes depth estimation of the 3D structures in the proximity of the vehicle 101 from the image plane (i.e., plane of the image 202). In one or more embodiments, the vehicle 101 is equipped with a plurality of lidars 112. Further, a BEV lidar image 210 is generated using the lidar data 208 captured by the lidars 112. The BEV lidar image 210 provides range information of the 3D structures from the ground plane. Multiple scans from the lidar(s) 112 may be captured and spatially aligned using information from an inertial measurement unit (IMU) to generate the BEV lidar image 210. The BEV lidar image 210 is an image of the proximity of the vehicle 101, where each pixel of the BEV lidar image 210 represents a detected object or reflectivity of a detection. The range information from the lidar 112 includes the height of each pixel from the image(s) 202.

In the event that the vehicle 101 is equipped with the lidar(s) 112, the model of the proximity of the vehicle 101 can be generated using the BEV camera image 204 and the BEV lidar image 210 using the height information that is captured by the lidar 112. The radar image 206 may not be required to generate the model if the lidar data 208 is available in one or more embodiments.

Figure 3:
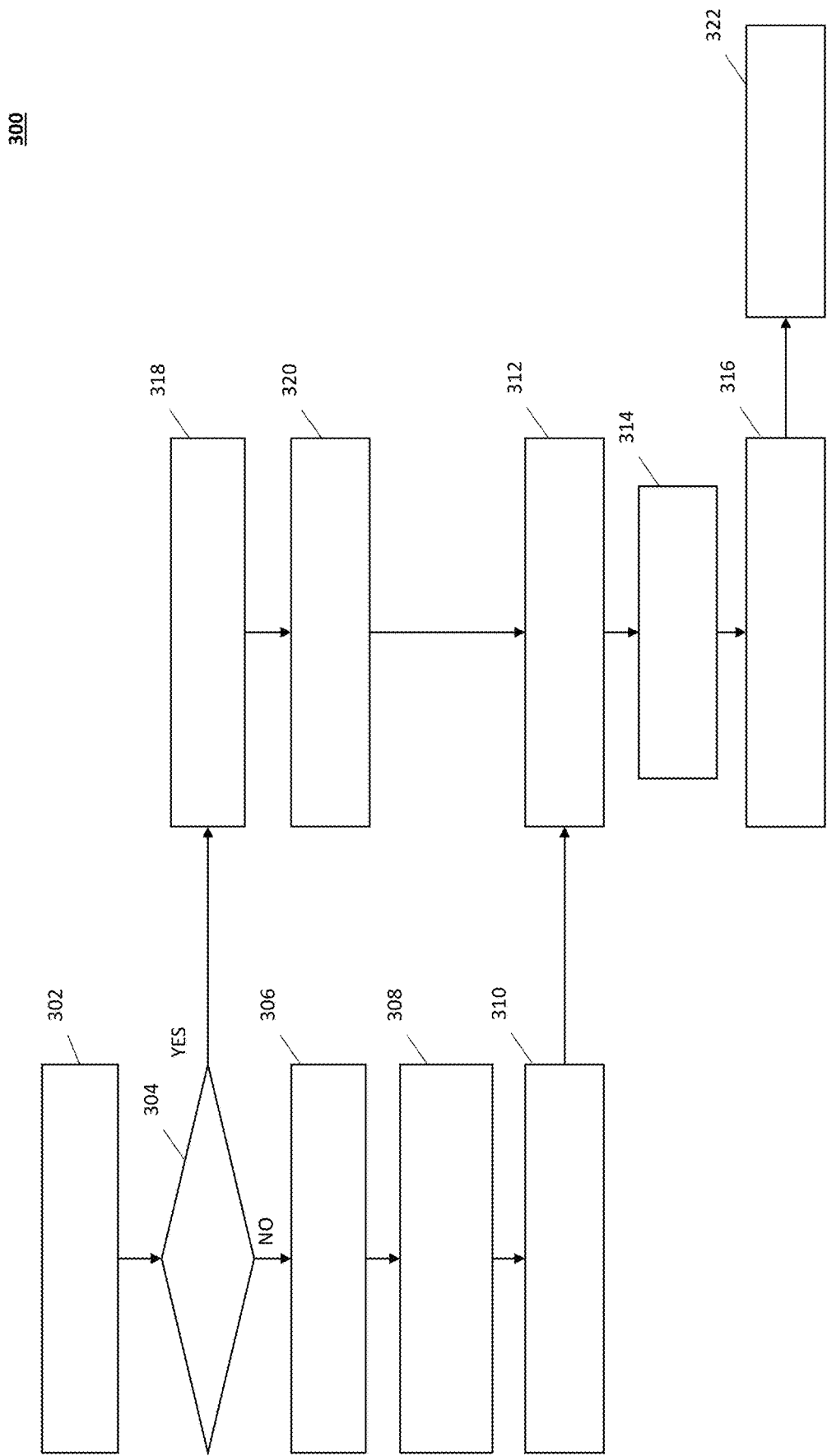
FIG. 3 depicts a flowchart of a method for estimating 3D models of static and dynamic structures in real-time from a vehicle according to one or more embodiments.

FIG. 3 depicts a flowchart of a method 300 for estimating 3D models of static and dynamic structures in real-time from a vehicle according to one or more embodiments. The method 300 includes generating a BEV camera image 204 of the proximity of the vehicle 101 using the cameras 108, at block 302. The BEV camera image 204 can be generated using one or more known techniques using a plurality of images captured by the camera 108.

The method 300 further includes determining if the vehicle 101 is equipped with lidar 112, at block 304. If the vehicle 101 is not equipped with lidar 112, the method 300 proceeds to generating the BEV radar image 206 of the proximity of the vehicle 101, at block 306. The BEV radar image 206 can be generated using one or more known techniques using a plurality of radar data captured by the radar 110.

At block 308, a merged image is generated by aligning and merging the BEV radar image 206 and the BEV camera image 204. The BEV radar image 206 and the BEV camera image 204 are transformed, for example, cropped, rotated, translated, so as to align and to match with each other. The alignment can be performed using known image registration techniques. The merging of the images includes using the radar information for each pixel from the BEV radar image 206 as a first channel in the merged image, and the color information from the BEV camera image 204 as the rest of the channels. For example, if the merged image has four channels: red, green, blue, and depth (RGBD), the RGB channels can be populated with the color data from the BEV camera image 204, and the D channel can be populated with the range data from the BEV radar image 206. It is understood that other combination of the channels can be used, and that in other examples, the merged image can include different channels than the example above. The merged image, accordingly, is a tensor that provides range and color information of the proximity of the vehicle 101 as represented by the pixels of the merged image.

Figure 4:
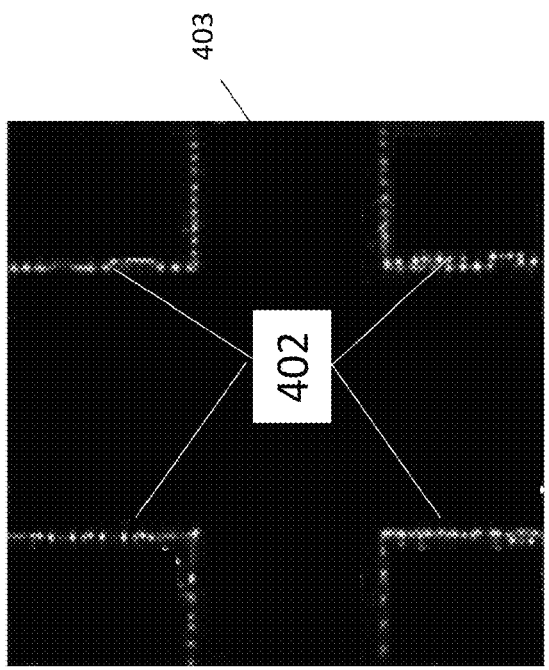
FIG. 4 depicts examples of images used for edge detection according to one or more embodiments.
Figure 4:
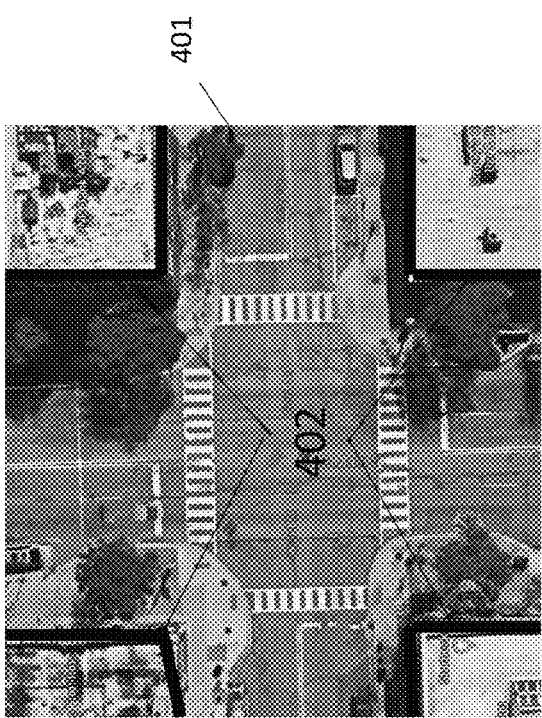

At block 310, a neural network analyzes the merged image to detect 3D structures, such as buildings, trees, towers, and other such objects in the proximity of the vehicle 101. The neural network is an artificial neural network such as, a convolutional neural network (CNN), a feedforward neural network, a multilayer perceptron, or any other such neural network. The neural network is pre-trained to detect the 3D structures, and particularly edges of buildings in the merged image that includes the range data and the camera data in the channels of data in the merged image. In this case, the range data is the data from the BEV radar image 206. FIG. 4 depicts example edges 402 of buildings that are detected in the merged image 401 from an example scenario. It is understood that in other embodiments, the merged image 401 and/or the detected edges 402 can be different from those depicted.

Coordinates for the detected edges 402 are determined in two dimensions, for example, XY coordinates, with reference to the vehicle 101, at block 312. For example, the coordinates of the vehicle 101 (e.g., the center of the vehicle 101) is configured to be (0, 0) (i.e., origin, and the coordinates of the edges 402 are determined with that reference). In an example, the coordinates are determined based on the number of pixels from the origin or in any other relation with the number of pixels.

Further, at block 314, coordinates in a third dimension, for example, Z coordinates, for the detected edges 402 are determined. The Z coordinates can be determined based on the range data in the merged image, and/or in the radar image 206. As noted earlier, using the range data, and the image 202 from the camera 108, the height of the edges 402 are calculated. In an example, the height information is stored as the value of the Z coordinates of the pixels represented by the XY coordinates in the merged images. Alternatively, pixels in the BEV radar image 206 that are corresponding to the XY coordinates of the edges 402 are identified. The depth information from the BEV radar image 206 is used as the Z coordinates.

At block 316, models of the 3D structures 104 are generated by performing plane-fitting using the XYZ coordinates of the edges 402. The plane-fitting can be performed using one or more known techniques such as using random sample consensus (RANSAC) algorithm, or any other known plane-fitting algorithms.

Alternatively, referring to block 304, if lidar 112 is available to the vehicle 101, the method 300 proceeds to generate the BEV lidar image 210 using the lidar data of the proximity of the vehicle 101, at block 318. The BEV lidar image 210 can be generated using one or more known techniques using a plurality of lidar data captured by the lidar 112. For example, the BEV lidar image 210 is generated by capturing the point cloud (i.e., lidar data 208 using the lidar 112). Further, the lidar data 208 is converted to a range image, where each pixel in the range image represents a detection (or not) from the lidar data 208. Such a conversion includes comparing the height (Z) at each point in the lidar data 208 with reference to a ground plane. The plane of the vehicle 101 is used as the ground plane for such computations. The height, with reference to the ground plane, for each point in the lidar data 208 can be computed using trigonometric functions and the range data for that point.

It should be understood that in other embodiments, different techniques can be used to determine the height of each point in the lidar data 208. The height image is subsequently projected on the ground plane, for example, using homography to obtain the BEV lidar image 210. Each pixel in the BEV lidar image 210 represents X, Y, Z coordinates of the 3D structures in the proximity of the vehicle 101, where the X and Y coordinates are the 2D coordinates on the ground plane in reference to the vehicle 101, for example, with the vehicle 101 as the origin. The Z coordinates (i.e., the height), can be represented by a grayscale (or any other color) value at the pixel.

Further, the BEV lidar image 210 is analyzed to detect edges 402 of the structures in the proximity of the vehicle 101, at block 320. The analysis can be performed by a neural network that is pre-trained to detect edges based on the XYZ values stored in the BEV lidar image 210, with the Z value representing the height stored as a color/intensity at each pixel coordinate (XY). Alternatively, the Z value represents the range data for each pixel. FIG. 4 depicts the edges 402 detected in a de-noised BEV lidar image 403. The de-noised BEV lidar image 403 is obtained by processing the BEV lidar image 210 using filters such as spatial domain filters, transform domain filters, etc. Such filtering can be linear and/or non-linear. Typical examples of such filters can include mean filter, Weiner filter, median filter, non-linear threshold filter, etc.

Once the edges 402 are detected, the method 300 further includes detecting the XY coordinates of the edges, at block 312. Further, the Z coordinates of the edges are detected, at block 314, using the range data. The range data can be obtained from sensors such as, the radar 110, the lidar 112, etc. Plane-fitting techniques are used to determine the models of the 3D structures 104, at block 316.

The method 300 further includes reconfiguring the GNSS receiver 155 based on the 3D models of the structures in the proximity of the vehicle 101, at block 322. The reconfiguration can include changing one or more radio channels (i.e., frequency) being used by the GNSS receiver 155. The 3D models are used to model the errors in radio signals, which otherwise, are not detected by a traditional GNSS receivers.

Embodiments described herein facilitate estimating 3D models of static and dynamic structures in real-time from a vehicle. The estimated 3D models can be applied to GNSS environmental modeling and map building. Existing "camera-only" approaches may have errors in estimated dimensions because of lack of depth information. The technical solutions described herein use radar and/or lidar to accurately detect the footprint of structures and combines that information with camera imagery to derive 3D models of the structures in the proximity of the vehicle.

The 3D models of structures, such as buildings, in the proximity of the vehicle 101 are used to improve performance of the GNSS receiver. The improvement to the operation of the GNSS receiver can be performed, using the technical solutions described herein, entirely online, avoiding need for a priori models, static maps of various regions, or continuous update of a map of the area where the vehicle is traveling. Technical solutions described herein, accordingly, a practical application to improve the operation of GNSS by saving communication intensive resources and operations.

Figure 5:
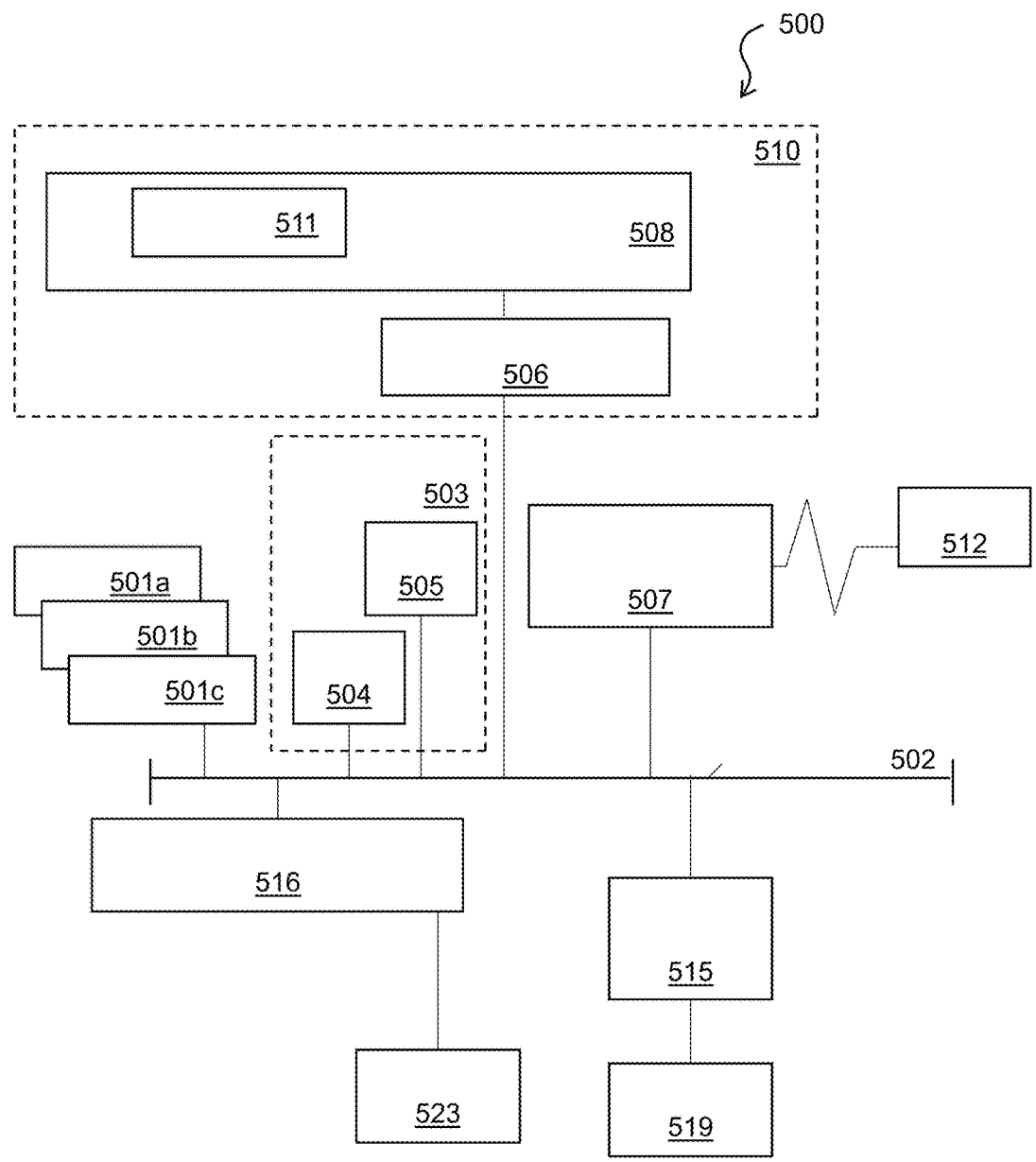
FIG. 5 depicts a computing system used to implement one or more embodiments described herein.

Turning now to FIG. 5, a computer system 500 is generally shown in accordance with an embodiment. The computer system 500 can be used as any of the devices and/or apparatus described herein, such as those equipped in the vehicle 101. In one or more embodiments, the computer system 500 implements on or more methods described herein. The computer system 500 can be an electronic, computer framework comprising and/or employing any number and combination of computing devices and networks utilizing various communication technologies, as described herein. The computer system 500 can be easily scalable, extensible, and modular, with the ability to change to different services or reconfigure some features independently of others. The computer system 500 may be, for example, a server, desktop computer, laptop computer, tablet computer, or smartphone. In some examples, computer system 500 may be a cloud computing node. Computer system 500 may be described in the general context of computer system executable instructions, such as program modules, being executed by a computer system. Generally, program modules may include routines, programs, objects, components, logic, data structures, and so on that perform particular tasks or implement particular abstract data types. Computer system 500 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, the computer system 500 has one or more central processing units (CPU(s)) 501a, 501b, 501c, etc. (collectively or generically referred to as processor(s) 501). The processors 501 can be a single-core processor, multi-core processor, computing cluster, or any number of other configurations. The processors 501, also referred to as processing circuits, are coupled via a system bus 502 to a system memory 503 and various other components. The system memory 503 can include a read only memory (ROM) 504 and a random-access memory (RAM) 505. The ROM 504 is coupled to the system bus 502 and may include a basic input/output system (BIOS), which controls certain basic functions of the computer system 500. The RAM is read-write memory coupled to the system bus 502 for use by the processors 501. The system memory 503 provides temporary memory space for operations of said instructions during operation. The system memory 503 can include random access memory (RAM), read only memory, flash memory, or any other suitable memory systems.

The computer system 500 comprises an input/output (I/O) adapter 506 and a communications adapter 507 coupled to the system bus 502. The I/O adapter 506 may be a small computer system interface (SCSI) adapter that communicates with a hard disk 508 and/or any other similar component. The I/O adapter 506 and the hard disk 508 are collectively referred to herein as a mass storage 510.

Software 511 for execution on the computer system 500 may be stored in the mass storage 510. The mass storage 510 is an example of a tangible storage medium readable by the processors 501, where the software 511 is stored as instructions for execution by the processors 501 to cause the computer system 500 to operate, such as is described herein with respect to the various Figures. Examples of computer program product and the execution of such instruction is discussed herein in more detail. The communications adapter 507 interconnects the system bus 502 with a network 512, which may be an outside network, enabling the computer system 500 to communicate with other such systems. In one embodiment, a portion of the system memory 503 and the mass storage 510 collectively store an operating system, which may be any appropriate operating system, such as the z/OS or AIX operating system from IBM Corporation, to coordinate the functions of the various components shown in FIG. 5.

Additional input/output devices are shown as connected to the system bus 502 via a display adapter 515 and an interface adapter 516 and. In one embodiment, the adapters 506, 507, 515, and 516 may be connected to one or more I/O buses that are connected to the system bus 502 via an intermediate bus bridge (not shown). A display 519 (e.g., a screen or a display monitor) is connected to the system bus 502 by a display adapter 515, which may include a graphics controller to improve the performance of graphics intensive applications and a video controller. A speaker 523, input devices such as touchscreens, buttons, and other such human-interactive devices (not shown), etc. can be interconnected to the system bus 502 via the interface adapter 516, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 5, the computer system 500 includes processing capability in the form of the processors 501, and, storage capability including the system memory 503 and the mass storage 510, input means such as the human-interactive devices (not shown), and output capability including the speaker 523 and the display 519.

In some embodiments, the communications adapter 507 can transmit data using any suitable interface or protocol, such as the internet small computer system interface, among others. The network 512 may be a cellular network, a radio network, a wide area network (WAN), a local area network (LAN), or the Internet, among others. An external computing device may connect to the computer system 500 through the network 512. In some examples, an external computing device may be an external webserver or a cloud computing node.

It is to be understood that the block diagram of FIG. 5 is not intended to indicate that the computer system 500 is to include all of the components shown in FIG. 5. Rather, the computer system 500 can include any appropriate fewer or additional components not illustrated in FIG. 5 (e.g., additional memory components, embedded controllers, modules, additional network interfaces, etc.). Further, the embodiments described herein with respect to computer system 500 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method or process may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A computer-implemented method for detecting one or more three-dimensional structures in a proximity of a vehicle at runtime, the computer-implemented method comprising:
  generating, by a processor, using a camera, a birds-eye-view (BEV) camera image of the proximity of the vehicle, the BEV camera image comprising two-dimensional coordinates of one or more structures in the proximity;
  generating, by the processor, a BEV height image of the proximity of the vehicle, the BEV height image providing height of the one or more structures in the proximity;
  detecting, by the processor, one or more edges of the one or more three-dimensional structures in the proximity based on the BEV camera image and the BEV height image;
  generating, by the processor, models of the one or more three-dimensional structures in the proximity of the vehicle by plane-fitting based on the edges of the one or more three-dimensional structures; and
  reconfiguring, by the processor, a navigation system receiver based on the models of the one or more three-dimensional structures in the proximity of the vehicle wherein reconfiguring the navigation system receiver includes changing a frequency being used by the navigation system receiver.

2. The computer-implemented method of claim 1, wherein the BEV height image is generated based on radar data captured from a radar of the vehicle.

3. The computer-implemented method of claim 2, wherein the BEV height image is a BEV radar image that is generated using the radar data.

4. The computer-implemented method of claim 3, wherein the detecting the edges of the one or more three-dimensional structures comprises:
  generating, by the processor, a merged image by merging the BEV camera image and the BEV radar image to add the height as a channel for each pixel in the BEV camera image; and
  detecting, by the processor, the edges by inputting the merged image to an artificial neural network.

5. The computer-implemented method of claim 1, wherein the BEV height image is generated based on lidar data captured from a lidar of the vehicle.

6. The computer-implemented method of claim 1, the camera includes a plurality of cameras equipped on different sides of the vehicle.

7. The computer-implemented method of claim 1, further comprising obtaining, by the processor based on the models of the structures in the proximity of the vehicle, navigation information for the vehicle from a phone associated with the vehicle.

8. The computer-implemented method of claim 1, wherein changing the frequency being used by the navigation system receiver increases the receivers line of sight of a satellite system.

9. An apparatus equipped in a vehicle, the apparatus comprising:
  a navigation system receiver;
  a camera;
  a memory; and
  a processor coupled with the navigation system receiver, the memory, and with the camera, wherein the processor is configured to perform a method for detecting one or more three-dimensional structures in a proximity of the vehicle at runtime, the method comprising:
  generating, by the processor, using the camera, a birds-eye-view (BEV) camera image of the proximity of the vehicle, the BEV camera image comprising two-dimensional coordinates of one or more structures in the proximity;
  generating, by the processor, a BEV height image of the proximity of the vehicle, the BEV height image providing height of the one or more structures in the proximity;
  detecting, by the processor, one or more edges of the one or more three-dimensional structures in the proximity based on the BEV camera image and the BEV height image;
  generating, by the processor, models of the one or more three-dimensional structures in the proximity of the vehicle by plane-fitting based on the edges of the one or more three-dimensional structures; and reconfiguring, by the processor, the navigation system receiver based on the models of the one or more three-dimensional structures in the proximity of the vehicle, wherein reconfiguring the navigation system receiver includes changing a frequency being used by the navigation system receiver.

10. The apparatus of claim 9, wherein the BEV height image is generated based on radar data captured from a radar of the vehicle.

11. The apparatus of claim 10, wherein the BEV height image is a BEV radar image that is generated using the radar data.

12. The apparatus of claim 11, wherein the detecting the edges of the one or more three-dimensional structures comprises:
   generating, by the processor, a merged image by merging the BEV camera image and the BEV radar image to add the height information as a channel for each pixel in the BEV camera image; and
   detecting, by the processor, the edges by inputting the merged image to an artificial neural network.

13. The apparatus of claim 9, wherein the BEV height image is generated based on lidar data captured from a lidar of the vehicle.

14. The apparatus of claim 9, the camera includes a plurality of cameras equipped on different sides of the vehicle.

15. A computer program product comprising a computer storage device that includes computer executable instructions, which when executed by a processor, cause the processor to perform a method for detecting one or more three-dimensional structures in a proximity of a vehicle at runtime, the method comprising:
   generating, by the processor, using a camera, a birds-eye-view (BEV) camera image of the proximity of the vehicle, the BEV camera image comprising two-dimensional coordinates of one or more structures in the proximity;
   generating, by the processor, a BEV height image of the proximity of the vehicle, the BEV height image providing a height of the one or more structures in the proximity;
   detecting, by the processor, one or more edges of the one or more three-dimensional structures in the proximity based on the BEV camera image and the BEV height image;
   generating, by the processor, models of the one or more three-dimensional structures in the proximity of the vehicle by plane-fitting based on the edges of the one or more three-dimensional structures; and
   reconfiguring, by the processor, a navigation system receiver based on the models of the structures in the proximity of the vehicle wherein reconfiguring the navigation system receiver includes changing a frequency being used by the navigation system receiver.

16. The computer program product of claim 15, wherein the BEV height image is generated based on radar data captured from a radar of the vehicle.

17. The computer program product of claim 16, wherein the BEV height image is a BEV radar image that is generated using the radar data.

18. The computer program product of claim 17, wherein the detecting the edges of the one or more three-dimensional structures comprises:
   generating, by the processor, a merged image by merging the BEV camera image and the BEV radar image to add the height as a channel for each pixel in the BEV camera image; and
   detecting, by the processor, the edges by inputting the merged image to an artificial neural network.

19. The computer program product of claim 15, wherein the BEV height image is generated based on lidar data captured from a lidar of the vehicle.

20. The computer program product of claim 15, the camera includes a plurality of cameras equipped on different sides of the vehicle.

* * * * *